United States Patent [19]

McCloskey

[11] 4,111,499
[45] Sep. 5, 1978

[54] BEARING ASSEMBLY AND LINER

[75] Inventor: Albert R. McCloskey, Fairfield, Conn.

[73] Assignee: The Heim Universal Corporation, Fairfield, Conn.

[21] Appl. No.: 746,752

[22] Filed: Dec. 2, 1976

Related U.S. Application Data

[63] Continuation of Ser. No. 563,569, Mar. 31, 1975, abandoned.

[51] Int. Cl.² ............................................. F16C 23/00
[52] U.S. Cl. ................................. 308/72; 308/237 R; 308/238; 308/DIG. 8
[58] Field of Search ........... 308/72, 237, 238, DIG. 8, 308/DIG. 12; 252/12

[56] References Cited

U.S. PATENT DOCUMENTS

| | | | |
|---|---|---|---|
| 2,995,462 | 8/1961 | Mitchell et al. | 308/DIG. 8 |
| 3,832,255 | 8/1974 | Shobert | 308/238 |
| 3,969,232 | 7/1976 | Turner | 308/72 |
| 4,006,051 | 2/1977 | Board, Jr. | 308/238 |

Primary Examiner—Richard A. Bertsch
Attorney, Agent, or Firm—James C. Wray

[57] ABSTRACT

A bearing liner adapted for extreme temperature applications comprising polybutadiene resin matrix having included therein a random dispersion of polytetrafluoroethylene particles, the resin matrix adhered to a backing material.

10 Claims, 7 Drawing Figures

BEARING ASSEMBLY AND LINER

This is a continuation of application Ser. No. 563,569, filed Mar. 31, 1975 now abandoned.

BACKGROUND OF THE INVENTION

The present invention relates to a method of constructing self-aligning bearings and bushings (all of which are hereinafter referred to as "bearings"), and to products produced thereby. This application comprises an improvement over my previous U.S. Pat. No. 3,471,207, patented Oct. 7, 1969, entitled "Bearing Liner Having Etched Particles Embedded Therein;" and U.S. Pat. No. 3,528,714, patented Sept. 15, 1970, entitled "Bearing and Method of Bearing Construction;" and U.S. Pat. No. 3,562,885, patented Feb. 16, 1971, entitled "Method of Making Bearing."

Traditionally, bearings have been lubricated by liquid lubricants such as oil. It has been necessary to design such bearings carefully so that they would retain oil for some time. Even with the best design, however, it has been necessary to periodically replenish the oil supply. If the oil was not replenished, either because the bearings were in out-of-the-way locations or because they were not properly maintained, the bearings became dry and wore rapidly.

Many efforts have been made to produce bearings using dry lubricants such as various types of plastic, graphite, or special chemicals. Generally speaking, these dry lubricants are soft and consequently are easily distorted under heavy loads. In particular, either the dry lubricant was squeezed out of the bearing or else the bearings became loose and wore rapidly. In addition, it is characteristically difficult to bond such dry lubricants to a desired bearing member. Furthermore, many efforts have been made to produce such dry lubricant bearings which are adaptable for extreme temperature applications, that is, for operation in temperatures ranging from $-100°$ to $+500°$ F. The results of these efforts have had only limited success and there still remains a distinct need for such bearing and liners therefor.

SUMMARY OF THE INVENTION

It is therefore an object of the present invention to provide a bearing having a liner which includes a dry self-lubricating material for providing a low sliding friction surface, and which is wear resistant under heavy and constant loads and is further capable of operating in a hostile environment at temperatures ranging from $-100°$ to $+500°$ F.

It is a further object of the present invention to provide a bearing liner for extreme temperature applications comprising polybutadiene resin matrix having included therein a random dispersion of polytetrafluoroethylene particles, said resin matrix adhered to a backing material.

It is a further object of the present invention to provide a bearing liner for extreme temperature applications wherein said polybutadiene resin matrix is mixed with an equal amount of Teflon particles by volume.

It is a further object of the present invention to provide a bearing liner for extreme temperature applications wherein said backing material is a member selected from a class consisting of plastic, fiber glass, fine wire mesh or Nomex.

It is a further object of the present invention to provide a bearing liner for extreme temperature applications comprising polyimide resin matrix having included therein a random dispersion of polytetrafluoroethylene particles, said resin matrix adhered to a backing material.

It is a further object of the present invention to provide a bearing liner for extreme temperature applications wherein said polyimide resin matrix is mixed with an equal amount of polytetrafluoroethylene particles by volume.

It is a further object of the present invention to provide a bearing liner for extreme temperature applications wherein said polyimide resin matrix is blended with a polyamide resin.

It is a further object of the present invention to provide a bearing liner for extreme temperature applications wherein the said polyimide is blended with said polyamide at a ratio of 98 percent polyimide to 2 percent polyamide by volume.

It is a further object of the present invention to provide a spherical bearing assembly comprising an outer member having a concave inner surface and an inner member having a convex outer surface and generally complementary to said inner surface, a bearing liner affixed to one of said surfaces, said bearing liner comprising polybutadiene resin matrix having included therein a random dispersion of polytetrafluoroethylene particles.

It is a further object of the present invention to provide a spherical bearing assembly comprising an outer member having a concave inner surface and an inner member having a convex outer surface and generally complementary to said inner surface, a bearing liner affixed to one of said surfaces, said bearing liner comprising polyimide resin matrix having included therein a random dispersion of polytetrafluoroethylene particles.

It is still another object of the present invention to provide a method of producing a spherical bearing comprising the steps of forming an outer bearing member and an inner bearing member, forming a bearing liner including an uncured adhesive polybutadiene resin and polytetrafluoroethylene in equal proportions by volume, curing the resin by applying heat to about 450° F. and pressure of 600 p.s.i. to the formed liner, and then affixing the cured liner between said outer and inner bearing members.

It is another object of the present invention to provide a method of producing a spherical bearing comprising the steps of forming an outer bearing member and an inner bearing member, forming a bearing liner including an uncured adhesive polyimide resin and polytetrafluoroethylene in equal proportions by volume, curing the resin by applying heat to about 450° F. and pressure of 600 p.s.i. to the formed liner, and then affixing the cured liner between said outer and inner bearing members.

It is another object of the present invention to provide a method of producing a spherical bearing wherein said polyimide resin matrix is blended with a polyamide resin in the ratio of 98 percent polyimide resin to 2 percent polyamide resin by volume.

It is a further object of the present invention to provide a method for fabricating bearings of the type described herein.

In accordance with one aspect of the present invention, a bearing liner is adapted to include a flocked or powdered self-lubricating plastic material, such as Teflon (a trademark of the DuPont Corporation for polytetrafluoroethylene) in etched and in unetched form adhered to a backing material.

The liner is produced by depositing a polybutadiene resin or a polyimide resin and Teflon particle mixture on the backing material. When the resin has set, the liner is cured by simultaneously applying heat and pressure thereto. The resulting calendered composition exhibits self-lubricating and load supporting properties, and is sufficiently flexible to be formed into cylindrical bearing liner shape. When a polyimide resin is employed it may be blended with polyamide resin in a proportion by volume of 98 to 50 percent of the mixture being polyimide and 2 percent of the 50 percent being polyamide.

In accordance with another aspect of the present invention, the liner is produced by forcing an adhesive into the interstices of a self-lubricating woven material, including for example, woven plastic, fiber glass, fine diameter wire (e.g, copper and stainless steel) and Nomex, under great pressure and simultaneously applying heat so that the adhesive cures. The pressure is sufficient to flatten the threads and flatten the weave of the cloth; and the adhesive, which is cured at the same time, holds the threads and the weave in the flattened condition. The resulting fabric, however, is still sufficiently flexible to be formed into a liner.

The above and other objects and features of the present invention will be apparent from the following detailed description of illustrative embodiments thereof presented hereinbelow in conjunction with the accompanying drawing.

DESCRIPTION OF THE INVENTION

Figure 4:
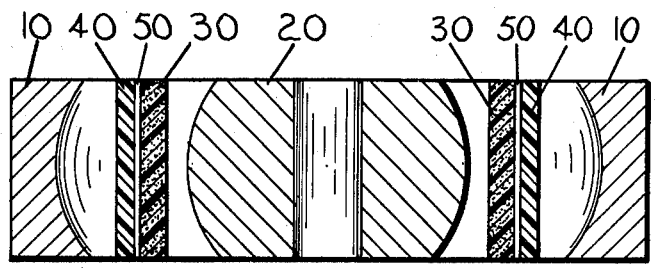
FIG. 4 illustrates another type of bearings produced by the present invention prior to assembly.

A first illustrative bearing liner made in accordance with the principles of the present invention employs a mixture of thermosetting polybutadiene or polyimide (blended and unblended) resin and particles of a self-lubricating, heat resistant plastic material, preferably Teflon (polytetrafluoroethylene). In one advantageous form of the invention, a mixture of approximately equal amounts by volume of polybutadiene resin manufactured by the Firestone Corporation as their polybutadiene resin No. TS253T or No. PS803T or No. TS203T, and Teflon powder is employed. The Teflon powder may be purchased, or prepared by rolling commercial sheet polytetrafluoroethylene and abrading the material with a file while it is rotating at a high rate of speed in a lathe. As an alternative to the powder, Teflon flocking comprising strands of polytetrafluoroethylene fiber, typically about 1/64 of an inch long, may be utilized. Such Teflon particles may be chemically etched to render them more bondable.

The Teflon powder polybutadiene resin mixture is deposited by painting, spraying or knife coating or the like on a backing material. The backing material may comprise, for example, a woven fabric having threads of Dacron (a trademark of the DuPont Corporation for a polyester staple length fiber), fiber glass, aluminum foil, other suitable plastics, fine diameter wire (e.g., copper or stainless steel), Nomex (a trademark of the DuPont Corporation for a variation of nylon used in high temperature applications such as fire fighter's suits) or the like. For additional lubricity, an additional layer of Teflon particles (powder or flock) may be deposited on the liner face most remote from the backer at this stage in liner processing.

Moreover, this liner face may also be dusted for this purpose with a suitable solid lubricant such as molybdenum disulfide. In addition to its lubricating properties, this composition further reduces bearing friction by coating the resin and leveling the valleys present at the interface between the bearing liner and inner member. However, it is not necessary to use molybdenum disulfide or other dry lubricants since the Teflon itself has excellent lubricating properties. The resin composition is allowed to stand on the backer material until set, typically about 1 day.

The composite liner is the placed between flat platens of a high pressure press. The press platens, heated for the above specified adhesive to a temperature in the range of 350°-500° Fahrenheit (advantageously about 450° F.) exert a pressure in the range of 400–1000 pounds per square inch (advantageously about 600 p.s.i.). The foregoing conditions obtain for about ½ hour except for a short reduction in the applied pressure for gas relief.

In order to increase production, a sandwich may be made starting with stainless steel, a slip of pure Teflon, an uncured composite liner, another layer of pure Teflon, another uncured liner, and so forth, terminating in a final layer of stainless steel. The slip sheets of pure Teflon are used to avoid the sticking of the resin to the rigid steel members. It is observed, however, that the thickness of the sandwich is limited so that the adhesive line of every sheet attains the requisite curing temperature. To this end, and also for mechanical rigidity, additional intermediate layers of stainless steel, having Teflon slip sheets on either side thereof, may be employed.

The foregoing operation causes the polybutadiene resin to cure, i.e., to irreversibly harden by polymerizing, thereby locking the polytetrafluoroethylene particles in place affixed to the backing material. After the curing cycle, the calendered liner is removed from the press, and is flexible in the sense that it may be readily bent into tubular form.

Another layer of uncured resin is next applied to the liner material, and more particularly to the liner backer. The second coat of resin is allowed to set, e.g., to harden for about one day. The resin is preferably the same polybutadiene base resin used previously, although other adhesives may be employed. Such alternative adhesives may be purchased in film form.

Figure 5:
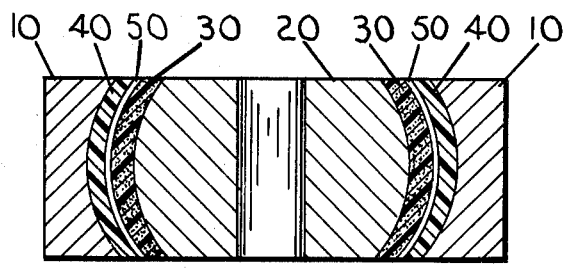
FIG. 5 shows the bearing of FIG. 4 after assembly.

As shown in cross-sectional form in FIG. 4, the liner material 30 with its uncured second coat of resin 40 and backer 50 is formed into a tube and placed between an outer ductile metal member 10 and an inner member 20 of a spherical bearing, the members 10 and 20 being, respectively, initially characterized preformed concave and convex mating surfaces. The bearing is then contracted under pressure, for example, by forcing a tapered die over the outer member to form the assembled bearing shown in FIG. 5.

Since the Teflon particles are locked in the cured resin which adheres to the backer, the liner does not exhibit the "spring" which characterized prior art woven fabric liners. Accordingly, after contraction, the liner made according to the present invention is not deformed by heavy applied loads. Thus, close and uniform tolerances are maintained between the inner and outer bearing members.

Subsequent to assembly and contraction, the bearing is placed in an oven where it is heated to a temperature somewhat less than that employed in the first curing cycle, i.e., to about 450° for the polybutadiene adhesive. Its somewhat lower temperature is sufficient to cure the second coat of resin and bond the composite liner 30 to the outer member 10. Moreover, since the temperature is lower than that obtained during the first curing operation, the lubricating surface of the liner facing the inner member 20 does not soften during this latter heating process. Accordingly, there is no undesired adhesion between the liner 30 and the inner member 20. If desired, the liner 30 may be placed with the resin backing against the inner member 20 so that it adheres thereto.

Figure 6:
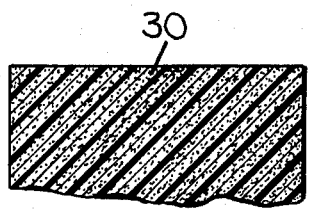
FIGS. 6 and 7 comprise truncated cross-sectional views of two alternative bearing liner compositions employed in the bearing of FIG. 4.
Figure 7:
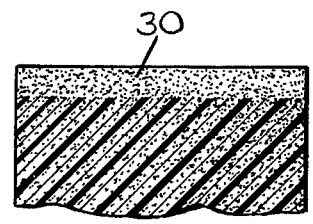

FIGS. 6 and 7 are employed to respectively illustrate in cross-sectional form, bearing liners 20 which respectively do, and do not include the optional additional tetrafluoroethylene particles at the self-lubricating (upper) surface thereof.

As noted above, the polytetrafluoroethylene particles may or may not be etched prior to being mixed with the resin to render the particles bondable with the resin. Such etching of polytetrafluoroethylene is well known in the art and described, for example, in R. J. Purvis, et al., U.S. Pat. No. 2,789,063 issued Apr. 16, 1957 or G. Rappaport, U.S. Pat. No. 2,809,130 issued Oct. 8, 1957.

For explanatory purposes only, and without limiting the scope of the present invention, these improved properties are believed to follow from chemical bonding or adhesion which takes place between the polytetrafluoroethylene particles and the surrounding cured resin matrix in the composite bearing liner. The resulting liner is mechanically strong, and therefore exhibits superior load bearing and wear characteristics, since the matrix is continuous and free from discontinuities at the polytetrafluoroethylene particle locations, there being bonds between the resin and the polytetrafluoroethylene at such locations. This is contrasted with prior art bearing embodiments which, at most, employ a resin matrix to merely physically entrap polytetrafluoroethylene particles. The resin in such prior art devices thus includes matrix lattice weakening discontinuities or voids about the polytetrafluoroethylene partices therein. Most importantly, the resulting liner performs efficiently and effecienly and effectively in hostile environments and, particularly, in environments experiencing wide ranges of temperature changes in a range of −100° to +500° F.

In accordance with another aspect of the present invention, a bearing liner is advantageously fabricated from a resin base of polyimide resin rather than from a polybutadiene resin. It has been found that the substitution of the polyimide resin for the polybutadiene resin also results in an improved bearing liner which also performs efficiently and effectively in environments experiencing wide ranges of temperatures in a range of −100° to +500° F. Accordingly, the present invention contemplates the use of either polybutadiene or polyimide resins as the resin base each to be used in equal proportions by volume with polytetrafluoroethylene particles. Such polyimide resin may be purchased from Columbia Technical Co. designated as their 1C40 or 1C46 polyimide resin or KERIMID 500 polyimide resin as manufactured by Rhodia, a French company.

The polyimide resin may be also used in a blended form with another resin to improve its performance characteristics. Such other resin may be a polyamide resin which may be blended with polyimide resin in the proportion by volume of 98 percent polyimide resin and 2 percent polyamide resin, said 98 percent and 2 percent being 50 percent of the total mixture.

The above described features of the present invention have been illustrated in a bearing liner having a backing comprising a ductile member 10. It is to be noted that the backing of the liner may take other suitable forms such as plastic, fiber glass, fine wire (e.g., copper or stainless steel) or Nomex. For example, the backing may be a cloth woven of Teflon threads. Such cloth may comprise a single woven embodiment, or a compound, double woven material including threads of Teflon interwoven with threads of a more readily adherent material, such as cotton or Dacron. Cloth of this latter type is manufactured by the Russell Manufacturing Company.

The uncured thermosetting resin, e.g., the aforementioned polybutadiene or polyimide (blended with polyamide or unblended) are applied to one surface of the cloth material. The resin may be applied by painting, spraying, calendering and the like. Here also, the side opposite the resin coating is dusted with Teflon.

The woven cloth, with its polybutadiene or polyimide resin coat on one side, is placed between flat platens of a high pressure press. The press platens are heated under high pressure, with the platens remaining closed until the resin is cured. The requisite temperature is comparable with that given above regarding the Teflon particle liner when the like resin around 1500 p.s.i. depending upon the weave of the Teflon cloth. To increase production the above described "sandwich" technique of employing alternate layers of uncured liners Teflon slip sheets between stainless steel outer elements may be employed.

After the curing cycle, the impregnated cloth is removed from the press. The cloth at this point in the process is flexible in the sense that it may be readily bent into a tubular form. It is, however, not as flexible as the pure cloth. When the cloth is bent, it does not crack and the cured adhesive does not separate from the cloth.

Another layer of uncured resin is then applied to the compressed cloth. If a double woven cloth is used, the second coat is applied to the side showing the adhesive threads. This second coat of resin is likewise painted onto the cloth, although other methods may be used for applying the resin.

Figure 1:
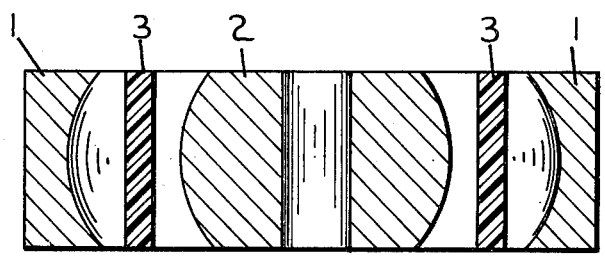
FIG. 1 shows one type of bearing produced by the present invention prior to assembly.
Figure 2:
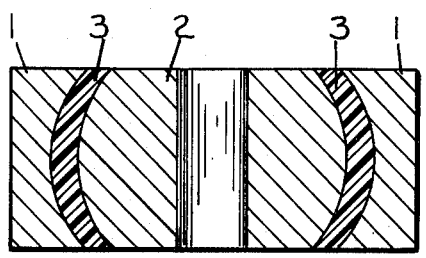
FIG. 2 shows the bearing of FIG. 1 after assembly.

As shown in FIG. 1, the compressed cloth with its second coat of uncured resin 3 is then formed into a tube and placed between the outer ductile metal member 1 and the inner member 2 of a spherical bearing, the members 1 and 2 being respectively initially characterized by preformed concave and convex mating surfaces. The bearing is then contracted under pressure to form the assembled bearing shown in FIG. 2.

Since the fibers of the compressed liner cloth are locked in the cured resin, the cloth does not exhibit the "spring" which characterizes woven fabrics. Accordingly, after contraction, the liner made according to the present invention is not deformed by heavy applied loads. Thus close and uniform tolerances are maintained between the inner and outer bearing members. As with the before described liner, this liner will be capable of withstanding operational temperatures in the range of −100° to +500° F.

Subsequent to contraction and assembly, the bearing is placed in an oven where it is heated. This heating cures the second coat of resin and bonds the Teflon cloth 3 to the outer member 1, if desired, the cloth may be placed with the resin backing against the inner member 2 so that it adheres to the inner member.

Figure 3:
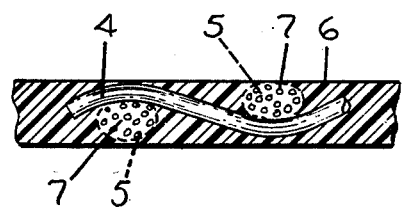
FIG. 3 is a cross-section view of adhesive impregnated cloth made in accordance with the present invention.

As shown in FIG. 3, the pressures used in accordance with the present invention force the adhesive 6 between the warp and the woof of the cloth as well as between the filaments 7 making up each of the threads of the cloth. The adhesive 6 binds the filaments one to another as well as binds the threads together such that the threads when flattened are held in this flattened condition by the adhesive.

Although the above illustrative embodiments of my invention have been directed to the construction of spherical bearing members, the same process may be used to produce a bushing or other bearing member. In such case, the outer member 1 or 10 and the inner member 2 or 20 have straight mating walls.

It is to be understood that the above described method and arrangements are only illustrative of the application of the principles of the present invention. Numerous other methods and arrangements may be devised by those skilled in the art without departing from the spirit and scope of the invention. For example, a liner may be fabricated by depositing pure adhesive on a backing material, and then depositing Teflon particles on the self-lubricating liner surface. Also, the Teflon particles and cloth discussed above may be fabricated from carbon filled polytetrafluoroethylene available from the Garlock Packing Co. Further, in the case of the woven liner, the base resin may be applied on both sides of the basic liner fabric between the heated platens to provide greater penetration of the resin into the interstices of the fabric.

I claim:

1. A bearing liner adapted for extreme temperature applications comprising a resin matrix selected from the group consisting of a polyimide resin matrix and a polybutadiene resin matrix having included therein a random dispersion of polytetrafluorethylene particles, said resin matrix adhered to a backing material, thereby providing a bearing liner having an extensive operating temperature range.

2. A bearing liner adapted for extreme temperature applications in accordance with claim 1 wherein said resin matrix is a polybutadiene resin matrix.

3. A bearing liner adapted for extreme temperature applications in accordance with claim 2 wherein said polybutadiene resin matrix is mixed with an equal amount of polytetrafluoroethylene particles by volume.

4. A bearing liner adapted for extreme temperature applications in accordance with claim 3 wherein said backing material is a member selected from a class consisting of plastic, fiber glass, fine wire mesh or a high temperature nylon-like material.

5. A bearing liner adapted for extreme temperature applications in accordance with claim 1 wherein said resin matrix is a polyimide resin matrix.

6. A bearing liner adapted for extreme temperature applications in accordance with claim 5 wherein said polyimide resin matrix is mixed with an equal amount of polytetrafluoroethylene particles by volume.

7. A bearing liner adapted for extreme temperature applications in accordance with claim 6 wherein said polyimide resin matrix is blended with a polyamide resin.

8. A bearing liner adapted for extreme temperature applications in accordance with claim 7 wherein the said polyimide is blended with said polyamide at a ratio of 98 percent polyimide to 2 percent polyamide by volume.

9. A spherical bearing assembly comprising an outer member having a concave inner surface and an inner member having a convex outer surface and generally complementary to said inner surface, a bearing liner affixed to one of said surfaces, said bearing liner comprising polybutadiene resin matrix having included therein a random dispersion of polytetrafluoroethylene particles.

10. A spherical bearing assembly comprising an outer member having a concave inner surface and an inner member having a convex outer surface and generally complementary to said inner surface, a bearing liner affixed to one of said surfaces, said bearing liner comprising polyimide resin matrix having included therein a random dispersion of polytetrafluoroethylene particles.

* * * * *